June 19, 1945. S. H. CLARK 2,378,888
CHANNEL RUNWAY
Filed July 11, 1941 2 Sheets-Sheet 1

INVENTOR.
Stewart H. Clark
BY
Dyer + Kirchner

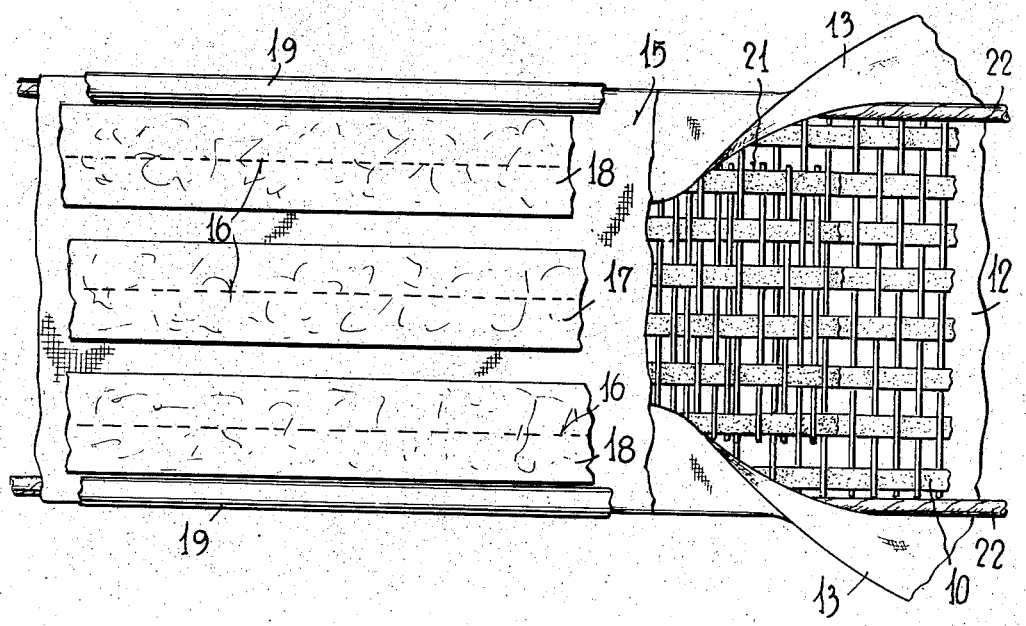
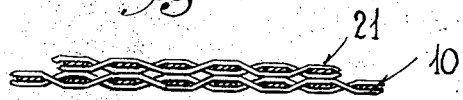
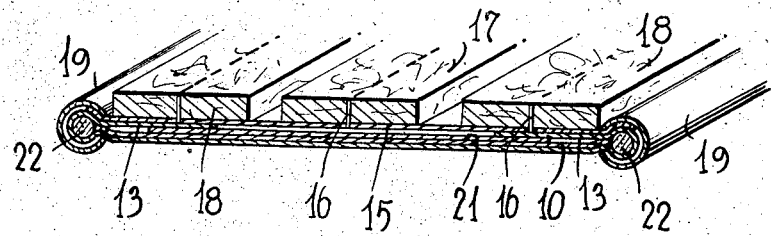

Patented June 19, 1945

2,378,888

UNITED STATES PATENT OFFICE 2,378,888

CHANNEL RUNWAY

Stewart Harvey Clark, Chicago, Ill., assignor to Backstay Welt Company, Union City, Ind., a corporation of Indiana Application July 11, 1941, Serial No. 402,018

6 Claims. (Cl. 296—44.5)

This invention relates to channel runways for sashless glass window panes such as are extensively used in automobile bodies.

These channel runways are fixedly mounted in appropriate grooves formed around the side and top margins of window and door light openings in automobile and other vehicle bodies. Their principal functions are to receive the advancing free edge of the top of the pane as it is moved to fully closed position, to make good sliding engagement with the side margins, to cushion the pane so as to absorb shocks and eliminate rattling and other noises, and to trim the openings and give them a finished, ornamental appearance.

The so-called streamlining of automobile bodies which is currently in vogue has resulted in window and door light openings of irregular shape, frequently involving unprecedentedly sharp curves at what may be regarded as the upper corners of the openings. In many cases the side and top margins of the openings make angles smaller than right angles, and the curvature of the "corner" connecting the side and top lines is of very short radius. The body maker naturally objects to using channel runway stock in several pieces to trim a single opening, since a more permanent installation is made, and labor costs are reduced, if a single length of stock can be curved so as to extend up one side of the opening, across the top and down the other side. The inability of the best runways of the prior art to be neatly curved around the "corners" of the modern shaped openings has made it difficult or impossible to install them in single lengths for each opening, or has resulted in kinks, puckers, collapsed zones and actual breakdown of the runways and has caused much dissatisfaction among the body makers and purchasers of the vehicles.

An important object of this invention is to provide a runway which can be readily curved without cross-sectional deformation or breakdown of its assembled parts so as snugly to fit a curvature of the shortest radius likely to be encountered.

A further object is to reduce the cost of a perfectly satisfactory runway by employing inexpensive component materials. This object is attained, in part at least, by the adoption of connecting or securing means and relationships for the several plies and other parts which means and relationships are novel in this particular art and tend to compensate for the low individual strength and durability of the several component plies and other parts.

The result is novel channel runway which has been found in actual practice to be superior in respect of low manufacturing cost, ease of installation, appearance and durability to the best prior art devices of which I am aware.

Certain preferred embodiments of the invention will now be explained in conjunction with the appended drawings which form part of this application for Letters Patent, but it is to be understood that these embodiments are merely illustrative of the invention and are not to be taken as restrictive. The invention is capable of being embodied in further and different forms within the scope of the appended claims.

In the drawings,

Fig. 5 is a view similar to Fig. 1 but showing a modified type of runway;

Fig. 6 is a cross-sectional view of the two stiffening plies of the Fig. 5 type of runway;

Fig. 7 is a view like Fig. 2 but showing the Fig. 5 type of runway.

Figure 1:
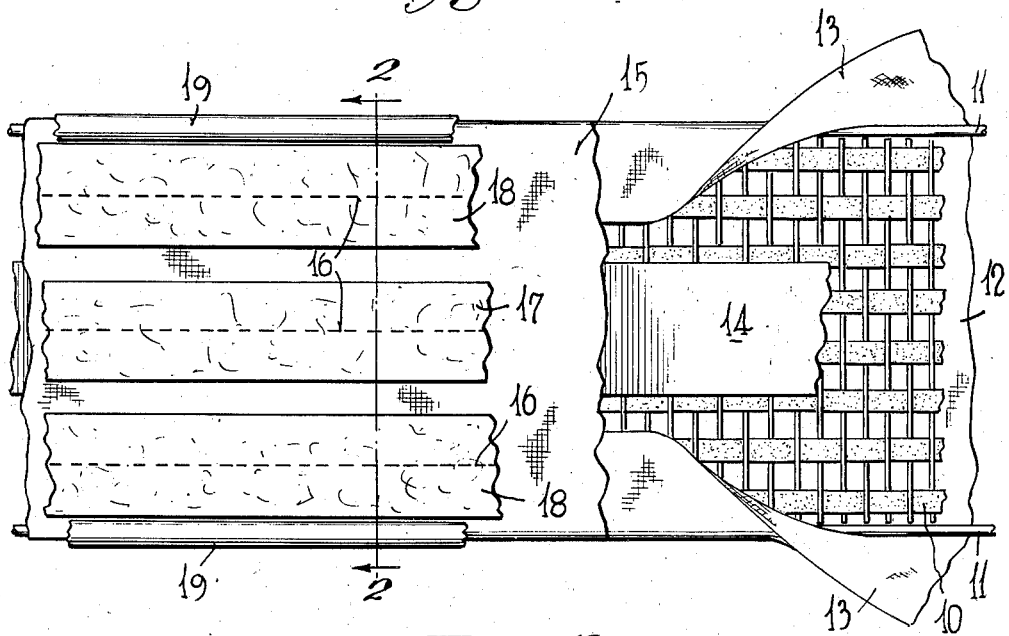
Figure 1 is a top plan view of a runway blank, as yet unfolded to channel shape, with certain of the parts broken away or expanded so as to show the internal construction.
Figure 2:
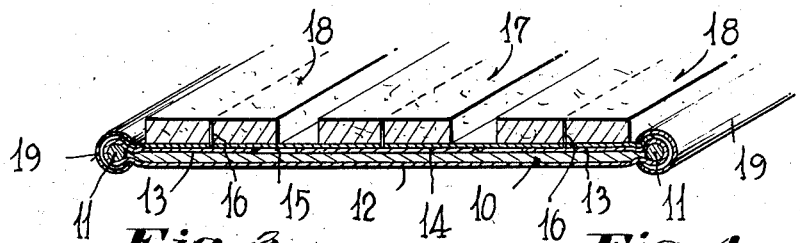
Fig. 2 is a sectional perspective view of the blank shown in Fig. 1.

Referring to the drawings, the manufacture of a preferred type of channel runway according to the principles of the present invention begins with the selection of a suitable stiffening ply or strip 10, preferably one having transverse pliable inert wire components like that which forms the subject of U. S. Patent No. 2,245,540 to Glen G. Barr. Such a strip is inexpensive and functionally ideal for my present purpose and it has therefore been selected for use in illustrating the invention, but it is to be understood that other and specifically different stiffening strips may be substituted. The principal requirements of the strip are that it embody transverse wire or functionally equivalent components that extend to the extreme longitudinal edges of the strip and that the strip be substantially as wide as the runway blank, i. e., equal in width to the combined widths of the finished channel base and its two side flanges.

Along each longitudinal edge of the stiffening strip, in contact with the strip or at least very close to it, I place a filament 11 which may be a metallic wire of somewhat larger gauge than the wires of the stiffening strip, or it may be a twisted strand of paper ribbon or a cord of cotton, jute or other fiber.

An exterior backing strip 12 is selected of some inexpensive textile material, such as plain woven cotton cloth, in a width approximately half again as great as that of the stiffening strip 10. The stiffening strip and its associated filaments 11 are laid centrally on the backing strip so that equal side margins 13 project from the backing strip, and these margins are then turned and folded inwardly, down on to the upper face of the stiffening strip so as to enclose the filaments 11 in the edge folds and produce appreciable beads along the two side edges of the composite body. The two strips 10 and 12 are best held together by some adhesive, as are also the stiffening strip and the margins 13. One form of the Barr strip disclosed in Patent No. 2,245,540 incorporates a temporarily or permanently tacky coating which is adequate to hold the exterior backing strip and its margins. Optionally an applied cement may be used, preferably one that does not set up hard and rigid but rather remains fairly flexible.

Down the longitudinal central zone of the upper surface of the combined backing and stiffening strips is laid a ribbon 14 of thin sheet metal which is easily bendable. Its width is appreciably narrower than the space between the oppositely facing inner edges of the margins 13, so that spaces approximating ten per cent more or less of the width of the runway blank are left between the central ribbon and the infolded margins 13. The elements are so proportioned that the ribbon 14 will be substantially as wide as the base or web of the finished channel, and the spaces between the ribbon and the margins 13 constitute lines or narrow zones of relative weakness which facilitate bending of the blank to demark the channel base or web from its side flanges, as will be explained hereinafter.

An interior ply 15 is next selected of material like that of the exterior backing strip 12 and is provided in a width at least as great as, and preferably slightly greater than, the stiffening strip 10. To this ply 15 are secured, preferably each by a central line of stitching, three equally spaced relatively narrow cushioning pads of felt or the like. The central pad 17 extends along the precise center zone of the ply 15 and is somewhat narrower than the metal ribbon 14. The two side pads 18 are spaced from the central pad and from the side edges of the ply 15. The assembly consisting of the pads and the ply 15 which mounts them is adhesively secured to the composite body which consists of the stiffening strip, the metal ribbon and the backing strip with its margins folded over the edge filaments, the ply 15 being adhesively secured to the backing strip margins, the metal ribbon, and the area of the stiffening strip intervening between the ribbon and infolded margins, all as is plainly indicated in Fig. 1.

Figure 4:
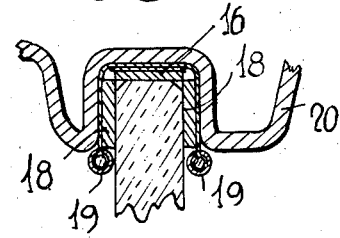
Fig. 4 is a cross-sectional view through a window pane and frame and an associated runway.

The spacing between the pads is such that when the blank is folded right angularly along the lines or zones of weakness between the ribbon 14 and the infolded margins 13, to transform the flat blank into a body of channel shape, the fold lines will be disposed between adjacent pads and the opposite edges of adjacent pads will become juxtaposed to provide a channel interior completely faced with padding, as is indicated in Fig. 4. The position of each side pad 18 on the ply 15 is such that a comparatively narrow side marginal zone of the ply 15 is left unpadded. The proportions of the parts here involved are such that the outer edges of the side pads 18 come a little short of the filaments 11. It will be remembered that the edges of the ply 15 extend over the filaments 11.

This feature of the construction is important because it enables a finishing bead 19, which is a tubular metallic shell of initially some 270° of arc, to be slipped over the bead formed by each filament 11, the folded portion of the backing strip 12 which connects it with the adjacent margin 13, and the margin of the internal ply 15, and to be pressed closed, or to more completely circular contour, so as very securely to clamp all these parts together and to the adjacent marginal edge of the stiffening strip 10. That is to say, each finishing bead 19, because of the proportions of the exterior and interior plies and of the stiffening strip, tenaciously clamps both these plies to the stiffening strip, and more particularly to the wires thereof. The result is a union of these important parts of the assembly which does not become broken down under any conditions of use and which is proof against most kinds of abuse.

The spacing between the outer edge of each side pad 18 and the adjacent edge of the interior ply 15 is such as to permit the clamping lips of the finishing bead 19 to clear the pad while being closely juxtaposed to the pad. The result is that none of the area of the ply 15, or no substantial part of it, is exposed between the finishing beads and the side pads. The inexpensive material of which the ply 15 is made is thus well protected from contact with the glass pane, which would damage it, and from exposure to weathering, which would in a short time deteriorate it. The finishing beads are stiffly supported in their desired positions of maximum channel width spacing because the wires of the stiffening ply extend into these finishing beads and are clamped by the lips thereof. The limpness of the beaded margins of prior art channel runways of this general type has been a source of great annoyance, frequently resulting in a falling together of the beaded edges into the line of the advancing glass pane and the consequent crushing of the channel flanges down on to the channel base or web. No such difficulty is experienced with the present channel.

The stiff support of the beaded edges serves a further important purpose. It tends to protect the edges of the side pads 18 from endwise contact by the advancing glass pane which would curl the felt and disintegrate it. This improved effect is probably best understood from Fig. 4, where it will be noticed that the finishing beads guide the pane in a very straight path centrally between the side pads 18. Although these beads protrude from the groove formed in the vehicle body 20, the stiffening ply or strip 10 supports them against falling outwardly or inwardly. Thus supported, they guide the advancing pane, the edges of which are slightly beveled, to harmless sliding engagement with the faces, as distinguished from the cut edges, of the side pads 18. If the beads were to fall outwardly, they would not guide the pane and it would strike the cut edges of the pads and soon curl them from their mounting strip 15 or peel their surface layers from their interior ones. If the beads were to fall inwardly, they would obstruct the advancing pane and the channel would soon be crushed into complete collapse. But stiffly supported in proper spaced relation, the beads guide the pane straight between the side pads, and the edge corners of these pads are met by the beveled edges of the pane and pushed outwardly by a sort of camming action so that the felt at these corners is compacted rather than disintegrated and the engagement between the glass and the side pads is a purely sliding one. The surface of the felt is capable of withstanding this sort of engagement almost indefinitely.

Accordingly, it is possible and even advantageous with the present invention to employ inexpensive felt cushion pads in place of the expensive specially woven pile fabrics commonly used in prior art devices of this general type. Furthermore, the felt pads can be secured to their mounting fabric by a single line of coarse stitches and the mounting fabric can be very light and cheap, because the stress on the pads, stitches and mounting fabric is practically all in compression, rather than in tension.

Figure 3:
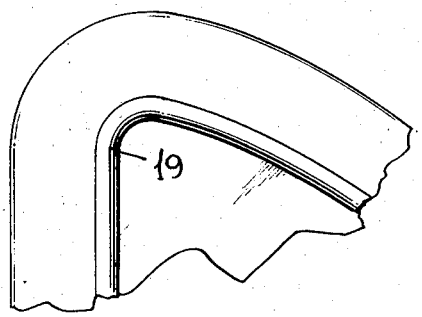
Fig. 3 is a side elevational view of a portion of the finished runway disposed about a curve of short radius.

Fig. 3 depicts a curved length of the runway and indicates that absence of puckering, kinking and other types of collapse which additionally distinguishes the present product from those of the prior art. The metal ribbon 14 is of course substantially incompressible and inextensible longitudinally, as are the finishing beads 19. In making a short curve the beads slide sufficiently along their clamping connection with the body plies, but the flanges of the runway, having transverse metallic stiffening means extending all the way from the base ribbon to and into the edge beads, accommodate themselves to the requirements of a lowered ratio of length at the bead to length at the base without noticeable distortion. I attribute this result to the stiff support which the strip 10 gives the whole of each flange, from the incompressible and intensible ribbon 14 to the equally incompressible and inextensible bead 19. There is no evidence of that tendency of the flanges to collapse or bow inwardly which is characteristic of most prior art runways.

In the modification depicted in Figs. 5, 6 and 7, a relatively narrow strip 21 of stiffening material like the strip 10 is cemented to the stiffening strip 10 in substitution for the metal ribbon 14 of Fig. 1. In Fig. 5, cords 22 of twisted paper ribbon or of cotton or the like are shown substituted for the metalwire filaments 11. The construction is otherwise the same as the Fig. 1 embodiment of the invention.

The Fig. 5 modification exhibits certain functional differences from the Fig. 1 embodiment and for some kinds of installations will be preferred. It will be noted that the strip 21 is wider than the metal ribbon 14 and extends across the fold lines dividing the channel base or web from the flanges. Consequently the strip 21 extends into the runway flanges, occupying about one half the width thereof and stiffening the bottom zones of the flanges. This supports these zones against tendency to collapse or bow inwardly when the channel is bent around a curve of particularly short radius, thus eliminating a defect that has been especially troublesome in many prior art runways.

Fig. 6 shows the plies 10 and 21 cemented together. While in this figure and in Figs. 5 and 7 the narrower ply is shown on top of the wider, the relationship may if desired be reversed. It is particularly desirable to place the narrower ply below the wider if the stiffening material is comparatively thick. In that case the slight bulge produced by the addition of the narrower ply occurs on the outside of the channel, rather than on the inside, and the inside presents a smooth, even appearance.

It will be understood that fibrous filaments 22 are shown in Fig. 5 and metallic ones in Fig. 1 merely to illustrate that these materials can be used alternatively in both forms of the device. Nothing in either construction requires the use of any particular filament material.

I claim:

1. A channel runway including a base and two side flanges for a sashless glass window pane comprising one-piece inside stiffening ply extending across the base and both side flanges, bead filler filaments engaging the longitudinal edges of said ply, an exterior backing strip having its side margins folded inwardly over the side margins of the stiffening ply and enclosing said filaments, an interior ply covering said inturned side margins of the backing strip and extending from one filament to the other, central and side cushioning pads secured to the interior ply, a stiffening ribbon disposed along the base only, between said stiffening and interior plies and having its side edges spaced from the inturned side edges of the backing strip to provide lines of weakness for folding the flanges up from the base, and finishing beads embracing the folded edges of the backing strip, the edges of the stiffening ply, and the juxtaposed raw edges of the interior ply, clamping all of said edges to said filaments and being supported by the stiffening ply so as to overlap the side cushioning pads and guide the advancing edge of the window pane into the channel runway, thereby protecting the edges of said pads from destructive contact with the pane and avoiding injury to said pads.

2. A channel runway for a sashless glass window pane comprising an inside stiffening ply of independent self-sustaining textile material including transverse wire, bead filler filaments engaging the longitudinal edges thereof, an exterior backing strip having its side margins folded inwardly over the side margins of the stiffening ply and enclosing said filaments, an interior ply covering said inturned side margins of the backing strip and extending from one filament to the other, central and side cushioning pads secured to the interior ply, and finishing beads embracing the folded edges of the backing strip, the edges of the stiffening ply, and the juxtaposed raw edges of the interior ply, clamping all of said edges to said filaments and being supported by the stiffening ply so as to overlap the side cushioning pads and guide the advancing edge of the window pane into the channel runway, thereby protecting the edges of said pads from destructive contact with the pane and avoiding injury to said pads.

3. A channel runway for a sashless glass window pane comprising an inside stiffening ply of independent self-sustaining textile material including transverse wire, bead filler filaments engaging the edges thereof, an exterior backing strip having its side margins folded inwardly over the side margins of the stiffening ply and enclosing said filaments, an interior ply covering said inturned side margins of the backing strip and extending from one filament to the other, central and side cushioning pads comprising three spaced apart felt strips stitched to the interior ply, and finishing beads embracing the folded edges of the backing strip, the edges of the stiffening ply, and the juxtaposed raw edges of the interior ply, clamping all of said edges to said filaments and being supported by the stiffening ply so as to overlap the side cushioning pads and guide the advancing edge of the window pane into the channel runway, thereby protecting the edges of said pads from destructive contact with the pane and avoiding injury to said pads.

4. In a channel runway including a base and two side flanges for a sashless glass window pane, the combination of one-piece inside stiffening ply of textile material including transverse wires extending across the base and both side flanges, bead filler filaments engaging the edges of said ply, a rear facing strip wider than the stiffening ply and having its side margins folded over the filaments and secured to portions of the stiffening ply substantially coextensive with the side flanges of the runway, a front facing strip extending from fold to fold of the rear facing strip and adhesively secured to the inturned side margins thereof, flange cushioning pad formations mounted on the front facing strip over said inturned side margins, a stiffening ribbon disposed along the base only, between said stiffening and interior plies and having its edges spaced from the inturned side edges of the backing strip to provide lines of weakness for folding the flanges up from the base, and finishing beads embracing the edges of the front facing strip and the folded edges of the rear facing strip, clamping said edges about said filaments and to the stiffening ply and being supported by the stiffening ply so as to overlap the flange cushioning pad formations and guide the advancing edge of the window pane into the channel runway, thereby protecting the edges of said formations from destructive contact with the pane and avoiding injury to said formations.

5. A channel runway for a sashless glass window pane comprising an inside stiffening ply including a strip of textile material having transverse wires extending the full width of the base and both side flanges of the runway and a similar ply engaged therewith extending across the base and into the lower portions only of the side flanges, bead filler filaments engaging the longitudinal edges of the wider stiffening ply, an exterior backing strip having its side margins folded inwardly over the side margins of the wider ply and enclosing said filaments, an interior ply of textile material covering said inturned side margins of the backing strip and extending from one filament to the other, central and side cushioning pads mounted on the interior ply, and finishing beads embracing the folded edges of the backing strip and the juxtaposed raw edges of the interior ply and clamping the same about said filaments and to the wider stiffening ply.

6. A channel runway for a sashless glass window pane comprising an inside stiffening ply extending the full width of the base and both side flanges of the runway and a similar ply engaged therewith extending across the base and into the lower portions only of the side flanges, bead filler filaments engaging the longitudinal edges of the wider stiffening ply, an exterior backing strip having its side margins folded inwardly over the side margins of the wider ply and enclosing said filaments, an interior ply of flexible material covering said inturned side margins of the backing strip and extending from one filament to the other, central and side cushioning pads mounted on the interior ply, and finishing beads embracing the folded edges of the backing strip and the juxtaposed raw edges of the interior ply and clamping the same about said filaments and to the wider stiffening ply.

STEWART H. CLARK.